US007336204B2

(12) United States Patent
Mandy

(10) Patent No.: US 7,336,204 B2
(45) Date of Patent: Feb. 26, 2008

(54) METHOD FOR MONITORING A PARKING LOT WITH PARKING METERS AND CORRESPONDING PARKING METERS

(75) Inventor: Damien Mandy, Fontain (FR)

(73) Assignee: Schlumberger Systemes (FR)

( * ) Notice: Subject to any disclaimer, the term of this patent is extended or adjusted under 35 U.S.C. 154(b) by 677 days.

(21) Appl. No.: 10/502,899

(22) PCT Filed: Jan. 27, 2003

(86) PCT No.: PCT/FR03/00250

§ 371 (c)(1),
(2), (4) Date: Sep. 23, 2004

(87) PCT Pub. No.: WO03/065325

PCT Pub. Date: Aug. 7, 2003

(65) Prior Publication Data

US 2005/0104723 A1 May 19, 2005

(30) Foreign Application Priority Data

Jan. 29, 2002 (FR) .................................. 02 01069

(51) Int. Cl.
*B60Q 1/48* (2006.01)

(52) U.S. Cl. .............................. 340/932.2; 340/539.11; 340/539.13

(58) Field of Classification Search ............ 340/932.2, 340/933, 904, 988, 539.11, 539.13, 539.16, 340/539.17, 309.16; 194/200, 217; 701/1, 701/2; 705/13
See application file for complete search history.

(56) References Cited

U.S. PATENT DOCUMENTS

| | | | | |
|---|---|---|---|---|
| 4,812,805 | A * | 3/1989 | Lachat et al. | 370/439 |
| 6,380,851 | B1 * | 4/2002 | Gilbert et al. | 340/517 |
| RE37,822 | E * | 8/2002 | Anthonyson | 701/1 |
| 6,791,473 | B2 * | 9/2004 | Kibria et al. | 340/932.2 |
| 6,812,857 | B1 * | 11/2004 | Kassab et al. | 340/932.2 |
| 6,823,317 | B1 * | 11/2004 | Ouimet et al. | 705/13 |
| 6,907,227 | B2 * | 6/2005 | Fujioka | 455/41.3 |
| 7,019,670 | B2 * | 3/2006 | Bahar | 340/932.2 |

* cited by examiner

*Primary Examiner*—Van T. Trieu
(74) *Attorney, Agent, or Firm*—Sofer & Haroun, LLP

(57) ABSTRACT

A method for monitoring a number of terminals, particularly parking meters, in which at least first and second adjacent terminals are able to communicate with each other and with a monitoring center, comprises a monitoring protocol according to which the first and second terminals must call each other and, if no call and/or reply is received from the second terminal, the first terminal calls the monitoring center to inform it of an abnormal situation concerning the second terminal.

13 Claims, 1 Drawing Sheet

METHOD FOR MONITORING A PARKING LOT WITH PARKING METERS AND CORRESPONDING PARKING METERS

RELATED APPLICATION

This application is a National Phase Application of PCT Patent Application No. PCT/FR03/00250, filed on Jan. 27, 2003, which in turn claims the benefit of priority from French Patent Application No. 02 01069, filed on Jan. 29, 2002, the entirety of which are incorporated herein by reference.

BACKGROUND OF THE INVENTION

1. Field of the Invention

The invention relates to automatic payment devices of the terminal or parking meter type made available to the public and more particularly to protecting such devices against fraudulent attack.

2. Description of the Prior Art

Being isolated and liable to contain money, these payment devices are likely to be attacked, meaning either the device itself or its communication means, and must therefore be equipped with means of dissuasion.

Generally speaking, such dissuasion means must have the functions of detecting an attack and reporting an attack.

Already known in the art are public payment terminals intended to be installed in the streets of a town and provided with means of dissuasion against attack.

Each terminal has a connection to the telephone network and means for detecting an attack.

When an attack is perpetrated against a terminal, it dials the telephone number of a monitoring center and sends it an alert signal.

These prior art terminals have a number of drawbacks.

This is because the existence of the alert means is known to fraudsters who tend to cut off communication between the terminal and the monitoring center using suitable devices such as GSM signal jamming devices.

The object of the invention is to remedy the drawbacks of the prior art by providing reliable and low-cost means of dissuasion against attacks on terminals.

SUMMARY OF THE INVENTION

According to a first object of the invention, the latter relates to a method for monitoring a number of terminals, particularly parking meters, in which at least first and second adjacent terminals are equipped with communication means which enable the first and second terminals to communicate with each other and with a monitoring center, which method comprises a monitoring protocol according to which the first and second terminals must call each other and, if no call and/or reply is received from the second terminal, the first terminal is adapted to call the monitoring center to inform it of an abnormal situation concerning the second terminal.

The use of this method calls for each of the terminals to monitor its neighbors and to be monitored by its neighbors.

Thus there is internal monitoring at the level of the terminals, with no intervention from the monitoring center.

This internal monitoring is effected by means of calls between terminals, incurring no telecommunication operator expenses.

A telephone call to the monitoring center is triggered only when an anomaly has actually occurred, i.e. when one of the terminals detects the absence of a response from one of its neighbors or an attack on itself.

In another embodiment, the monitoring protocol further comprises a step in which each of the terminals reports a fraudulent attack against it by contacting the monitoring center directly or by contacting an adjacent terminal that contacts the monitoring center.

Also, the terminals may communicate by means of a local radio network.

Also, a terminal and the monitoring center may communicate by means of a public telephone network.

According to a second object of the invention, the latter provides a device for monitoring a number of terminals, in particular parking meters, in which at least first and second adjacent terminals are equipped with communication means which enable the first and second terminals to communicate with each other and with a monitoring center; the first and second terminals must call each other and the method comprises monitoring means in the first terminal at least and adapted if no call and/or no reply is received from the second terminal to call the monitoring centre and inform it of the abnormal situation concerning the second terminal.

The invention further provides a terminal comprising communication means enabling communication with at least a second terminal and with a monitoring center and control means for sending calls to the second terminal and monitoring means adapted in the absence of a call and/or a response from the second terminal to call the monitoring center to inform it of the abnormal situation concerning the second terminal.

According to another embodiment the terminal must call at least one adjacent terminal at regular intervals.

According to another embodiment the terminal further comprises means for detecting fraudulent attacks and is adapted to report an attack against itself by contacting the monitoring center directly or by contacting an adjacent terminal that contacts the monitoring center.

The means enabling the terminal to communicate with the second terminal may comprise a radio transceiver device.

The means enabling the terminal to communicate with the monitoring center may comprise means for connection to a public telephone network.

Other features and advantages of the invention will become apparent in the light of the following description and from the drawings.

DETAILED DESCRIPTION OF THE DRAWINGS

Figure 1:
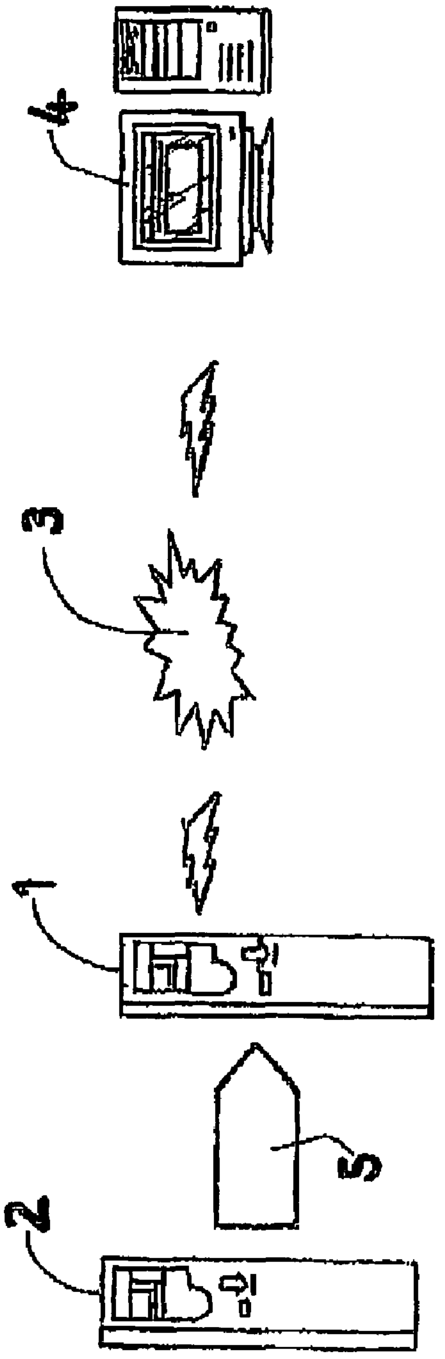
FIG. 1 represents a pair of parking meters and a monitoring center, showing a first parking meter receiving a call from a second parking meter.
Figure 2:
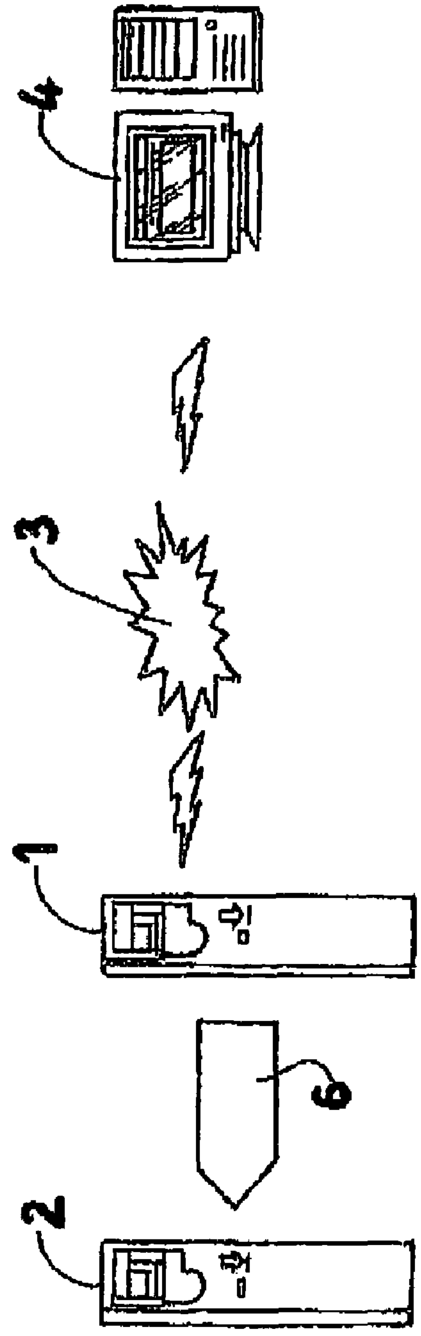
FIG. 2 represents a pair of parking meters and a monitoring center, showing a first parking meter making a call to a second parking meter.

For clarity the system represented in FIGS. 1 and 2 comprises just two parking meters 1, 2, a telephone network 3 and a monitoring center symbolized by a microcomputer 4.

In the example described, the telephone network 3 is a wireless network such as a GSM network, but it may be any communication network, for example a network open to the public such as the fixed PSTN or the like.

The monitoring center 4 comprises data processing means connected to the telephone network 3 and adapted to receive and process calls from the parking meters 1, 2.

The parking meters 1, 2 are equipped with data processing means and with means for connection to the telephone network 3 adapted to call the monitoring center 4 and send it an alert signal.

The alert signal takes the form of a binary code produced by the data processing equipment of the parking meters 1, 2 and transmitted in modulated form via the telephone network 3 to the monitoring center 4.

On receiving the alert signal, the monitoring center 4 demodulates the received signal to obtain the original binary code and identifies it as being an alert signal.

For this purpose it is necessary to establish a protocol for communication between the telephone center 4 and the parking meters 1, 2 to define the binary code corresponding to an alert signal.

In the same way, other codes corresponding to other information that could be transmitted between the monitoring center 4 and the parking meter 1, 2 may be defined.

The parking meters 1, 2 are further equipped with radio transmission means enabling each parking meter to communicate with all the parking meters in the coverage area of its transmission means.

For example, the transmission means comprise network cards conforming to the IEEE 802.111b wireless transmission standards enabling the parking meters to communicate with each other using the TCP/IP protocol, this particular protocol being specified by way of illustrative example only and being in no way limiting on the present invention. The parking meters preferably communicate using a wireless local loop (WLL) network. Different frequency bands may be used, for example infrared frequencies, the frequencies of the Bluetooth protocol, etc. The benefit of this mode of communication is that it is free of charge.

The system that has just been described operates in the manner indicated hereinafter.

The parking meters 1, 2 are installed in the streets of a town so that each is in the coverage area of the electromagnetic transmission means of at least one other parking meter.

In normal operation, each parking meter contacts at least its nearest neighbor, whose coordinates have previously been communicated to it, to verify that it is operating correctly, and is therefore contacted itself by its neighbors.

As with communication with the monitoring center 4, it is necessary to define a protocol by which the parking meters mutually verify that they are operating correctly.

To this end, a call code and a confirmation code are defined. When it contacts one of its neighbors, each parking meter sends the call code and waits for the confirmation code before deciding that the contacted parking meter is operating correctly.

Consequently, each parking meter must also send the confirmation code to each of the parking meters which, by sending the call code, prompts it to do this.

Also, to limit power consumption, only the radio transmission means are supplied with power during standby periods, thus assuring mutual verification of the terminals with only the absolute minimum energy expenditure.

FIG. 1 represents a parking meter 2 sending the call code to an adjacent parking meter 1 and FIG. 2 represents a similar situation, the parking meter 1 this time sending the confirmation code in response to the parking meter 2.

If the parking meter 2 is faulty, the sending of the call code shown in FIG. 1 does not take place and the parking meter 1, which is expecting to receive the call code periodically from the parking meter 2, detects the silence of the parking meter 2 and interprets this as failure of the parking meter 2.

The parking meter 1 then telephones the monitoring center 4 and sends it the alert code, identifying the parking meter 2 that is not responding.

Similarly, if the parking meter 1 is faulty, the sending of the confirmation code shown in FIG. 2 does not take place and the parking meter 2, which is expecting the confirmation code from the parking meter 1, detects the silence of the parking meter 1 and interprets this as failure of the parking meter 1.

The parking meter 1 then telephones the monitoring center 4 and sends it the alert code, identifying the parking meter 1 that is not responding.

Also, each parking meter is also equipped with attack detection means adapted to detect physical attack, such as a set of sensors placed on the components of the parking meter, and also adapted to detect attacks on its communication channels, such as data processing security devices taking account of attempted electromagnetic jamming or fraudulent connection to the data processing equipment of the parking meter.

If a parking meter detects this kind of attack on itself, it can either call the monitoring center 4 itself to report itself the victim of an attack or transmit an alert signal to one of its neighbors that will then contact the monitoring center.

These options may be used in combination for maximum security, the monitoring center 4 being alerted even if one of the two communication systems of the parking meter under attack is rendered unserviceable by the attack.

The invention provides the following advantages:

reduced parking meter operating costs by limiting charged calls to the monitoring center to what is strictly necessary and the alternative use of interterminal communication, the latter being free of charge in that they do not involve a telephone operator;

attacks targeted on the communication means of the parking meters are also detected;

the energy expenditures of the terminals are minimized by the selective supply of power to the components authorizing operation of only the interterminal transmission means during standby periods;

virtually immediate reaction to attacks, each terminal being itself able to report an attack against it.

The invention claimed is:

1. A method for monitoring a number of automatic payment terminals, including parking meters, said method comprising the steps of:

enabling at least first and second terminals to communicate with each other and with a monitoring center;

providing a monitoring protocol according to which said first and second terminals call each other and, if no call or reply is received from said second terminal; and said first terminal calling said monitoring center to inform it of an abnormal situation concerning said second terminal.

2. The method according to claim 1, wherein according to said monitoring protocol, said first and second terminals must call each other at predetermined intervals.

3. The method according to claim 1, wherein said monitoring protocol further comprises a step of reporting by each of said terminals, a fraudulent attack against it by contacting said monitoring center directly or by contacting an adjacent terminal that contacts said monitoring center.

4. The method according to claim 1, wherein each terminal calls a plurality of separate terminals in accordance with said monitoring protocol.

5. The method according to claim 1, wherein said terminals communicate by means of a local radio network.

6. The method according to claim 1, wherein said terminals and said monitoring center communicate by means of a public telephone network.

7. The method according to claim 1, wherein said first and second terminals are adjacent each other.

8. A device for monitoring a number of terminals, including parking meters, said device comprising:

at least first and second adjacent terminals, equipped with communication means, which enable said first and second terminals to communicate with each other and with a monitoring center, wherein said first and second terminals call each other; and a monitoring means in said first terminal, and adapted if no call or reply is received from said second terminal, to call said monitoring center to inform it of an abnormal situation concerning said second terminal.

9. An automatic payment terminal including a parking meter comprising:

communication means enabling communication with at least a second terminal and with a monitoring center;

a control means for sending calls to said second terminal; and a monitoring means adapted in the absence of a call or a response from said second terminals, to call said monitoring centers, to inform it of the abnormal situation concerning said second terminal.

10. The terminal according to claim 9, adapted to call at least said second terminal at regular intervals.

11. The terminal according to claim 9, further comprising means for detecting fraudulent attacks and adapted to report an attack against itself by contacting said monitoring center directly or by contacting an adjacent terminal that contacts said monitoring center.

12. The terminal according to claim 9, wherein said means enabling said terminal to communicate with said second terminal comprise a radio transceiver device.

13. The terminal according to claim 9, wherein said means enabling said terminal to communicate with said monitoring center comprise means for connection to a public telephone network.

* * * * *